United States Patent [19]
Blortz et al.

[11] Patent Number: 5,985,337
[45] Date of Patent: Nov. 16, 1999

[54] PROCESS FOR PREPARING A PROTEIN HYDROLYSATE FROM PROTEIN CONTAINING ANIMAL PRODUCTS

[75] Inventors: Doris Blortz, Ilsfeld; Hans Bohrmann, Talheim; Dieter Maier, Öhringen; Rudi Müller, Sinsheim, all of Germany

[73] Assignee: CPC International Inc., Englewood Cliffs, N.J.

[21] Appl. No.: 08/906,728

[22] Filed: Aug. 5, 1997

[51] Int. Cl.[6] .................................................. A23L 1/31
[52] U.S. Cl. ........................... 426/56; 426/55; 426/533; 426/657
[58] Field of Search ................. 426/32, 55, 56, 426/59, 533, 58, 63, 656, 657

[56] References Cited

U.S. PATENT DOCUMENTS

| | | | |
|---|---|---|---|
| 1,922,484 | 8/1933 | Mapson et al. | 426/32 |
| 3,743,514 | 7/1973 | Olson et al. | 99/109 |
| 4,130,555 | 12/1978 | Ohtsuka et al. | 260/117 |
| 5,356,637 | 10/1994 | Loosen et al. | 426/7 |

FOREIGN PATENT DOCUMENTS

| | | |
|---|---|---|
| 0223560 | 5/1987 | European Pat. Off. . |
| 0455278 | 11/1991 | European Pat. Off. . |
| 0505733 | 9/1992 | European Pat. Off. . |
| 0535135 | 4/1993 | European Pat. Off. . |
| 2537618 | 2/1977 | Germany . |
| 2841043 | 4/1980 | Germany . |
| 3620150 | 12/1987 | Germany . |
| 9401003 | 1/1994 | WIPO . |
| 9425580 | 11/1994 | WIPO . |

OTHER PUBLICATIONS

Pedersen B: Removing Bitterness from Protein Hydrolysates. Food Technology, vol. 48, No. 10, 1994, pp. 96–98, 76, XP000476598.

Seuss I: "Einfluss der Räucherung auf nährwertbestimmende Bestandteile v Fleischerzeugnissen. III. Proteinverdaulichkeit und Aminosäurengehalt bei Dosenbrühwurst und Rohwurst." Fleischwirtschaft, vol. 66, No. 4, 1986, pp. 544, 546, 548–550; 575 XP002088907.

Schropp K: Geschmacksverstärker auf Basis Pflanzlicher eiweisshydrolysat XP002088908 * Abstract* & Industrielle Obst– und Gemüseverwertung, vol. 56, No. 9, 1971, pp. 241–243.

H. Uhlig, Enzymes Work For Us, 1991, Hanser Berlag, p. 323—Abstract.

J. Adler–Nissen, Enzymic Hydrolysis of Food Protein, 1986, Elsevier Appl. Sc. Pub., pp 90 ff.

Margrander, Fleischwirtschaft 75: 1286–1287 (1995)—Abstract.

Behnke et al., Nahrung, 28: 397–407, 1984—Abstract.

Lin and Chen, Proc. Of AAAP 2: 1112–1114 (1985).

*Primary Examiner*—Leslie Wong
*Attorney, Agent, or Firm*—Norris, McLaughlin & Marcus

[57] ABSTRACT

The invention makes available a process for preparing a protein hydrolysate from protein containing animal products, in which process the animal products are hydrolysed using endopeptidases and exopeptidases. The process is characterized in that smoked, protein containing animal products are employed as protein containing animal products. By using smoked, protein containing animal products, a protein hydrolysate can be produced which does not have the bitter flavor which arises during the customary hydrolysis of protein containing animal products. Smoked pork rind is preferably employed for the hydrolysis.

8 Claims, No Drawings

PROCESS FOR PREPARING A PROTEIN HYDROLYSATE FROM PROTEIN CONTAINING ANIMAL PRODUCTS

FIELD OF THE INVENTION

The invention relates to a process for preparing a protein hydrolysate from protein containing animal products, in which the animal products are hydrolysed using endopeptidases and exopeptidases.

BACKGROUND OF THE INVENTION

The hydrolysis of meat with industrial enzyme preparations, such as proteinases, for the purpose of producing a protein hydrolysate or a flavor-imparting meat extract is disclosed in the state of the art, for example, in WO 94/01003, EP-A 505 733 and DE-A 28 41 043. The use of alkaline or neutral endopeptidases, such as Alcalase (NOVO) or Pescalase (GIST), of bacterial origin for the purpose of producing oligopeptide-rich hydrolysates from plant proteins, and also whey proteins and egg proteins, is also described, for example, in EP-A 511 970. The use of an endopeptidase and exopeptidase enzyme preparation (Flavorzyme) (NOVO), which is obtained from fungi, is described in WO 94/25580. In this case, protein hydrolysates having a relatively high degree of hydrolysis are produced from plant proteins and also from fish proteins and meat proteins, including gelatin.

The enzymic hydrolysis of protein from meat adhering to bones is well known in the state of the art and is nowadays carried out in meat-processing concerns with the aim of ensuring that residual material is fully utilized. This is known, for example, from H. Uhlig, *Enzyme arbeiten für uns* (Enzymes work for us), 1991, *Hanser Verlag*, pp. 325 ff., J. Adler-Nissen, *Enzymic Hydrolysis of Food Proteins*, 1986, *Elsevier Appl. Sc. Pub.*, pp. 90 ff. or Behnke et al., *Nahrung*, 28: 397–407, 1984. Residual materials from fish processing can also be used, with it being possible to use the fish's own enzyme system, as described in EP-A 535 135.

A fundamental problem in the enzymic hydrolysis of animal protein is the formation of a bitter flavor due to peptide fragments. In order to solve this problem, the state of the art proposes, for example in EP-A 223 560, employing proteolytic enzyme combinations consisting of endopeptidase and exopeptidase mixtures and aminopeptidases for degrading the resulting bitter tasting peptides. Furthermore, WO 94/01003, proposes adherence to a given degree of hydrolysis and the use of raw meat instead of the boiled commodity. DE-A 30 03 679 proposes masking the bitter-tasting substances with additives such as carbohydrates. Possibilities of avoiding or masking the bitter flavor are discussed in *Food Technology*, 48: 96–98 (1994).

The enzymic hydrolysis of collagen-rich material, for example gelatin, is likewise disclosed. The products which are obtained in this case are not so bitter as those obtained during the enzymic hydrolysis of meat. However, in this case, it is often only a partial hydrolysis of the protein, with a low degree of degradation, which is sought. The possible enzymic hydrolysis of rind and bones for the purpose of obtaining gelatin would be such an application. However, this application has up until now not been able to compete with the traditional disruption with acid and alkali because it is difficult to control the degree of hydrolysis precisely. The impression that enzymic gelatin hydrolysates have a flavor which is less bitter is due, inter alia, to the proportion of free amino acids which are possessed by collagen-rich material which do not taste particularly bitter. In particular, this material contains sweetly tasting amino acids such as glycine and less bitter tasting arginine.

Experiments for preparing hydrolysates from collagen-rich material are described, inter alia, by Lin and Chen, *Proc. of AAAP* 2: 1112–1114 (1985) and in JP-A 52 110874 and JP-A 52 099265. Collagen-rich hydrolysates can be obtained commercially (Marggrander, *Fleischwirtschaft* 75: 1286–1287 (1995)).

A hydrolysate prepared from collagen is also described in DE-A 25 37 618. In this case, a non-bitter product having a molecular weight of greater than 2000 daltons is obtained by hydrolysis in the alkaline range. DE-A 36 20 150 describes a collagen hydrolysate in the molecular weight range of 15,000 daltons as a replacement for common salt. U.S. Pat. Nos. 4,130,555 and 3,743,514 propose collagen hydrolysates prepared from gelatin and rind for protein enrichment in sausages.

However, if an attempt is made to hydrolyse protein-containing animal products, in particular raw or boiled pork rind, with this latter also being a collagen-rich material, for example using endopeptidases in this way, it is observed that, from a particular hydrolysis time onwards, markedly bitter tasting hydrolysates are to be expected, both in the case of the raw commodity and in the case of the boiled commodity, as the degree of hydrolysis increases. The bitterness can only be forced below the perception threshold when the degree of liquefaction is quite low, i.e., when the hydrolysis time is short, and when assisted by common salt, which serves to mask the bitter taste. The same problem arises when air-dried rind is hydrolysed. It is also found that hydrolysates prepared from fresh ham taste astringent, bitter and acid irrespective of whether the ham is raw or boiled.

Consequently, an object of the invention is to make available a process for preparing a protein hydrolysate which, even without masking and despite a high degree of liquefaction and a long hydrolysis time, does not taste bitter and which consequently constitutes an advantageous flavorant.

SUMMARY OF THE INVENTION

The achievement of this object is based on the surprising finding that the hydrolysis of protein containing animal products, leads, if carried out in a manner known per se but using smoked products, in particular smoked rind or smoked meat, to a hydrolysate which does not exhibit any bitter taste and which can, therefore, advantageously be employed as a seasoning agent. Whether or not bitter tasting peptide fragments are produced in the hydrolysis depends, both in the case of collagen and, even more clearly, in the case of muscle flesh, on the protein structure (conformation and crosslinking) which is present. Consequently, the appearance of bitterness is not only a question of the degree of hydrolysis but also, surprisingly, a question of the preliminary treatment of the protein. Probably, smoking results in a protein structure (protein crosslinking) which is altered in such a way that the production of bitter tasting peptides does not occur during the hydrolysis. The same result cannot be achieved by a preliminary treatment such as drying, salting or boiling the meat.

The invention consequently makes available a process for preparing a protein hydrolysate from protein containing animal products, in which the animal products are hydrolysed using proteases, characterized in that smoked, protein containing animal products are employed as protein containing animal products. The invention also makes available hydrolysates which can be prepared by this process and the use of these hydrolysates as flavorants.

According to the invention, any protein containing animal material can be used; however, the process is preferably applied to pork meat and, particularly preferably, to pork rinds. The process according to the invention is particularly suitable for making use of residual meat material, namely smoked ham rind, which arises during the preparation of smoked ham.

In addition, the process according to the invention can be carried out using cured or only using salted smoked ham rind. The resulting smoked rind extract does not taste bitter but has a rich smoky intensity.

DETAILED DESCRIPTION OF THE INVENTION

According to the invention, it is preferred that only one enzyme, preferably a neutral or an alkaline protease having an endopeptidase effect, for example Pescalase (Gist), Alcalase (NOVO) or Promod 31 (Biocatalysts) be employed for the hydrolysis. The hydrolysis can advantageously be carried out, without correcting the pH, until the raw material is liquefied, without adhering to any particular degree of hydrolysis. It is not necessary to add salt to the hydrolysis or to add another substance for the purpose of masking bitter tasting peptides.

The hydrolysis process can be carried out in a manner known per se. In that which follows, the invention is explained in more detail using the example of smoked pork rind; however, the process can also be applied in an analogous manner to other protein containing, smoked animal products.

In a particularly preferred process, smoked pork rind in partially defatted form is employed for the hydrolysis. A stable gustatory fat having a smoky character is additionally obtained by the rendering down or melting out of fat, and the subsequent purification of the hydrolysate is simplified. The fat can, without disadvantages as regards taste, also be separated off after the hydrolysis, so that it is possible to use rind which has not been defatted.

In the hydrolysis process, the rind is preferably comminuted mechanically, e.g., coarsely minced and disrupted by boiling or steaming and/or defatting prior to the enzymic treatment in order to optimize the hydrolysis yield and to shorten the process time. Particularly preferably, the rind is subjected, according to the invention, to puffing in a microwave oven, as described in the examples below, prior to the enzymic treatment.

After the end of the hydrolysis, the hydrolysate is heated in a customary manner, for the purpose of enzyme inactivation. The fatty phase, which settles out on top, is initially separated off, and the residual fat and the residual sediment are separated from the hydrolysate and clarified by subsequent centrifugation on separators. The product can be concentrated under reduced pressure or spray dried directly with or without the addition of a carrier substance. Although spray drying is preferred, other types of drying, such as vacuum belt drying, drum drying and freeze drying, are also possible. The flavorant which is produced tastes smoky, is fat-free and can be used as a natural smoked aroma. Aromatic hydrocarbons such as benzopyrene cannot be detected and the product is stable on storage at room temperature.

According to the invention, it is also possible to use proteinases which exhibit both endopeptidase and exopeptidase effects, e.g., flavorzyme (NOVO), and which consequently give rise to rind hydrolysates which have a relatively high content of free amino acids. In this case, smoky, sweet products are to be expected since the amino acids which are liberated from collagen, e.g., glycine, taste sweet. No bitterness arises in the case of this application either.

If rind is used in the process according to the invention, the additional advantage ensues that the gustatory fat which is produced can be used as a bacon fat substitute since it exhibits a typical smoked taste. The residual content of polycyclic hydrocarbons in the product is low and is below the limit of 1 ppb. Preferably, the animal fat is discharged into a vegetable fat, e.g., soya bean oil. Depending on the fat which is used for the discharge, the resulting gustatory fat has a more solid or liquid consistency at room temperature and is adequately stable during storage. The content of polycyclic hydrocarbons can be further reduced by appropriate choice of raw material or by using lightly smoked rind as the raw material.

A particularly advantageous application consists in recombining the smoked rind aroma by binding the gustatory fat to a starch support and subsequently mixing with the desired quantity of smoked rind extract powder. A fat containing flavoring compound is obtained which has a rich smoky taste.

The following examples illustrate the invention, but are not meant to limit the scope of the invention in any way.

All percentages in examples and description are by weight.

EXAMPLE 1

Enzymic hHdrolysis of Smoked Pork Rind (Table 1, Experiments Nos. 3 and 4)

Smoked ham rind is subjected to 13 mm mincing and is defatted. The rind has a solid matter content of 80%, 10.5% fat and 58% protein (N* 5.8, i.e., obtained by multiplying the nitrogen content by 5.8).

400 g of water and 2 g of Pescalase (bacterial endopeptidase available from Gist Brocades) are added to 200 g of this rind in a cooking pot. The hydrolysis is carried out at 50° C. for six hours in a shaker bath having a closed lid. The enzyme is inactivated by boiling for 10 minutes. The unhydrolysed residue is separated off using a household strainer and 100 g of moist residue are obtained. Fine sediment and fat are removed from the hydrolysate by centrifugation. A hydrolysate (24 Brix) is obtained which has a typical smoky meat character without any bitter quality.

If the hydrolysis is carried out for 17 hours, a hydrolysate is obtained of 26 Brix which does not taste bitter either. In this case, the residue weighs 66 g. The 17 hour hydrolysate contains little free amino acids (only 5% based on total amino acids). The hydrolysate is rich in glycine, proline and glutamic acid and also hydroxyproline and alanine (typical for collagen protein).

EXAMPLE 2

Hydrolysis of Boiled, Smoked Pork Rind (Table 1, Experiments Nos. 1 and 2)

Smoked ham rind is cut into pieces of 3 to 5 cm in size. The rind has a solid matter content of 71%, 26% fat and 40% protein (N* 5.8).

200 g of this rind are added, together with 400 g of water, to a cooking pot and the whole is boiled for one hour. The loss due to boiling is compensated for. The mixture is cooled down to 50° C. and 2 g of Flavorzyme (endopeptidase/exopeptidase mixture obtained from Aspergillus fungus, from Novo) are added. The hydrolysis is carried out at 50°

C. for six hours in a shaker bath having a closed lid. The enzyme is inactivated by boiling for ten minutes. The unhydrolysed residue is separated off using a household strainer and 200 g of moist residue are obtained. Fine sediment and fat are removed from the hydrolysate by centrifugation. A hydrolysate (10 Brix) is obtained which has a typical smoky meat character without any bitter quality.

If the hydrolysis is carried out for 17 hours, a sweet hydrolysate of 19 Brix and having a typical smoky meat character is obtained which does not taste bitter either. In this case, the residue weighs 95 g.

The Flavorzyme degrades the collagen in the rind to a lesser extent than does the Pescalase. On the other hand, the liberation of amino acids is improved with Flavorzyme as compared with Pescalase and, after 17 hours, the hydrolysate contains 35% free amino acids based on the total amino acids. The sweetly tasting glycine, and also alanine and proline, dominate among the free amino acids.

EXAMPLE 3

(Table 1, Experiments Nos. 5 to 8)

Different varieties of smoked meat, as listed in Table 1, are treated hydrolytically in the same manner as in Examples 1 and 2.

The results obtained in Examples 1 to 3 are listed in Table 1.

COMPARISON EXAMPLE 1

Raw or boiled pork rind, or other varieties of meat, which has not been smoked is subjected to an enzymic hydrolysis in the same manner as in Examples 1 and 2. The results are listed in Table 2.

EXAMPLE 4

(Table 3, Experiments Nos. 1 and 2)

Smoked ham rind is subjected to 13 mm mincing and defatted. The rind contains 20% water, 10.5% fat and 59.5% protein (N* 5.8). The rind is subjected to microwave treatment in a microwave oven of 2,500 watts nominal output, 1,250 watts energy output on a glass dish of 19 cm diameter. Each of the dishes is loaded with 100 g of defatted pork rind and puffing is allowed to proceed for 180 seconds at 100% output of the microwave oven. 27 g of water are lost and 73 g of puffed pork rind are obtained. The rind is crisp and strongly puffed up. The rind has less of a smoky character and, instead, the character of grilled meat (pork knuckle or crackling). This puffed pork rind is used for the enzymic hydrolysis.

140 g of puffed ham rind (corresponding to 200 g of the smoked rind used in Examples 1 and 2) are boiled with 400 g of water for one hour and the loss due to boiling is then compensated for. The mixture is cooled down to 50° C. and 2 g of Pescalase are added. The mixture is hydrolysed at 52° C. for six hours in a shaker bath. The enzyme is inactivated by boiling for ten minutes. The unhydrolysed residue is separated off using a household strainer. The moist residue weighs 66 g. Fine sediment and fat are removed from the hydrolysate by centrifugation. A non-bitter, slightly acid hydrolysate is obtained having a typical smoky character. The Brix value of the hydrolysate is 16.

If the hydrolysis is carried out for 17 hours, a hydrolysate of 20 Brix and having a typical smoky meat character is obtained which does not taste bitter either. The residue weighs 48 g. The results, and additional process conditions, are given in Table 3.

EXAMPLE 5

A flavoring compound is prepared from rendered gustatory fat and spray-dried smoked ham aroma by mixing 60 g of melted gustatory fat (fat>98%) with 140 g of smoked rind aroma (hydrolysate, spray-dried with 25% maltodextrin) for ten minutes using a commercially available food processor. The product which is obtained has an intense smoky/meaty taste and is readily soluble in water.

The invention now being fully described, it will be apparent to one of ordinary skill in the art that many changes and modifications can be made thereto without departing from the spirit or scope of the invention as set forth herein.

TABLE 1

Enzymic hydrolysis of smoked animal constituents

| No | Quantity of raw material | Raw material | Water | Preliminary treatment | Enzyme | Time | Residue | Brix | Tasting |
|---|---|---|---|---|---|---|---|---|---|
| 1 | 200 g | Smoked pork rind | 400 g | Boiled for 1 h | Flavorzyme 2 g | 6 h | 200 g | 9.5 | not bitter, not sweet, very smoky/meaty |
| 2 | 200 g | Smoked pork rind | 400 g | Boiled for 1 h | Flavorzyme 2 g | 17 h | 95 g | 19 | not bitter, sweet rich, smoky |
| 3 | 200 g | Smoked, defatted pork rind | 400 g | — | Pescalase 2 g | 6 h | 100 g | 24 | rich, smoky, acid smoky meat, not bitter |
| 4 | 200 g | Smoked, defatted pork rind | 400 g | — | Pescalase 2 g | 17 h | 66 g | 26 | rich, smoky, acid smoky meat, not bitter |
| 5 | 200 g | Schwarzwald ham (without rind) | 400 g | — | Pescalase 2 g | 6 h | 30 g | 13 | not bitter, rich smoky meat character |
| 6 | 200 g | Schwarzwald ham (without rind) | 400 g | Boiled for 1 h | Pescalase 2 g | 6 h | 40 g | 11 | not bitter, round, harmonious, typically smoky, less meaty |

TABLE 1-continued

Enzymic hydrolysis of smoked animal constituents

| No | Quantity of raw material | Raw material | Water | Preliminary treatment | Enzyme | Time | Residue | Brix | Tasting |
|---|---|---|---|---|---|---|---|---|---|
| 7 | 200 g | Pork rind smoked in the cold (without salt) | 400 g | — | Pescalase 2 g | 6 h | 91 g | 18 | not bitter, typically smoky |
| 8 | 200 g | Belly of pork, salted and smoked | 400 g | — | Pescalase 2 g | 6 h | 41 g | 11 | not bitter, typically smoky, typically of ham |

TABLE 2

Enzymic hydrolysis of raw pork rind and raw pork

| Experiment | Quantity (raw | Water | Preliminary treatment | Enzyme | Salt | Time | Residue | % NaCl | Brix | pH | Tasting (diluted 1:2) |
|---|---|---|---|---|---|---|---|---|---|---|---|
| 1 | 200 g (rind) | 400 g | None | Pescalase 2 g | 6 g | 6 h | 5 g | 1.34 | 18 | 6.90 | Slightly bitter |
| 2 | 200 g (rind) | 400 g | None | Pescalase 2 g | 6 g | 17 h | 2 g | 1.41 | 16 | 6.70 | Very bitter |
| 3 | 200 g (rind) | 400 g | Boiled for 1 h | Pescalase 2 g | 6 g | 6 h | 14 g | 1.38 | 16 | 6.59 | Slightly bitter |
| 4 | 200 g (rind) | 400 g | Boiled for 1 h | Pescalase 2 g | 6 g | 17 h | 1 g | 1.45 | 18 | 6.58 | Very bitter |
| 5 | 200 g (rind) | 400 g | None | Flavorzyme Sp 484 2 g | 6 g | 6 h | 94 g | 1.48 | 16.0 | 7.41 | Sweet slightly bitter, gelatin |
| 6 | 200 g (rind) | 400 g | None | Flavorzyme Sp 484 2 g | 6 g | 17 h | 30 g | 1.41 | 18.5 | 7.39 | Sweet, very bitter, 1/2 gelatin |
| 7 | 200 g (meat) | 400 g | None | Pescalase 2 g | — | 6 h | 5 g | 1.34 | 18 | 6.90 | Slightly bitter |
| 8 | 200 g (meat) | 400 g | None | Pescalase 2 g | — | 17 h | 2 g | 1.41 | 16 | 6.70 | Very bitter |

TABLE 3

Enzymic hydrolysis of smoked, defatted and puffed ham rind

| Experiment No. | Quantity of rind | Water | Boiled | 1st Quantity of enzyme (Pescalase) | 1st Time | 2nd Quantity of enzyme (Pescalase) | 2nd Time | Residue | Brix | Tasting |
|---|---|---|---|---|---|---|---|---|---|---|
| 1 | 140 g | 800 g | 1 h | 2 g | 17 h | — | — | 48 g | 16 | Smoky, slightly acid, not bitter |
| 2 | 140 g | 800 g | 1 h | 2 g | 6 h | — | — | 66 g | 16 | Not bitter, typically smoky |
| 3 | 200 g | 600 g | No | 2 g | 6 h | — | — | 90 g | 23 | Not bitter, typically smoky |
| 4 | 200 g | 600 g | No | 1 g | 3 h | 1 g | 3 h | 103 g | 24 | Not bitter, typically smoky |
| 5 | 140 g | 800 g | 1 h | 2 g | 6 h | — | — | 46 g | 16 | Not bitter, typically smoky |
| 6 | 140 g | 800 g | 1 h | 1 g | 3 h | 1 g | 3 h | 65 g | 15.5 | Not bitter, typically smoky |

What is claimed is:

1. A process for preparing a protein hydrolysate from a protein containing animal product, comprising:
   a) smoking said protein containing animal product; and
   b) hydrolyzing said smoked, protein containing animal product using proteases.

2. The process according to claim 1, wherein said proteases are selected from the group consisting of a protease having an endopeptidase effect and a proteinase having exopeptidase and endopeptidase effects.

3. The process according to claim 1, wherein said protein containing animal product is mechanically comminuted prior to the hydrolysis.

4. The process according to claim 1, wherein said smoked, protein containing animal product is pork rind.

5. The process according to claim 4, wherein said pork rind is thermally disrupted by microwave puffing prior to the hydrolysis.

6. The process according to claim 2, wherein said protease having an endopeptidase effect is selected from the group consisting of neutral proteases and alkaline proteases.

7. The process according to claim 1, wherein said protein containing animal product is disrupted prior to hydrolysis by a method selected from the group consisting of boiling, defatting and a combination thereof.

8. The process according to claim 1, wherein said protein containing animal product is treated, prior to hydrolysis, to alter the protein structure of said protein containing animal product.

* * * * *